United States Patent [19]
Green et al.

[11] 3,751,319
[45] Aug. 7, 1973

[54] METHOD FOR MAKING SIGNS AND OTHER ARTISTIC WORKS

[75] Inventors: Patrick Hart Green, Willowdale; George Wilbert Foster, Streetsville, both of Ontario, Canada

[73] Assignee: Mond International Limited, Pembroke, Bermuda

[22] Filed: Mar. 8, 1971

[21] Appl. No.: 121,993

[30] Foreign Application Priority Data
June 2, 1970 Canada .................................. 26647

[52] U.S. Cl. .................. 156/242, 40/135, 117/38, 156/246, 156/277, 156/289
[51] Int. Cl. .......................... B29c 21/00, G09f 7/00
[58] Field of Search ............. 156/242, 245, 277, 156/289, 310, 314, 315, 246; 117/38, 45, 161 K, 2 B, 12; 40/135

[56] References Cited
UNITED STATES PATENTS

| | | |
|---|---|---|
| 3,240,619 | 3/1966 | Winchester .................. 117/45 X |
| 3,471,312 | 10/1969 | Muenchinger et al. ............... 117/38 |
| 1,908,075 | 5/1933 | Stalder ................................ 156/246 |
| 3,137,601 | 6/1964 | Menzer ........................... 156/277 X |
| 3,552,986 | 1/1971 | Bassemir et al. .................. 117/38 X |
| 3,652,356 | 3/1972 | Van Gesse et al. .............. 156/277 X |
| 3,242,027 | 3/1966 | Dowda ............................ 117/38 X |
| 3,309,804 | 3/1967 | Gill ................................. 40/135 X |

Primary Examiner—Alfred L. Leavitt
Assistant Examiner—Caleb Weston
Attorney—Maybee & Legris

[57] ABSTRACT

Signs and other artwork are made with a clear facing layer of polyester resin protecting one or more coloured pattern layers. The pattern layers are applied by silk screening after the facing layer has cured to at least a tack free condition. At the rear is applied a background layer of polyester resin and a stiff glass fibre backing layer.

9 Claims, 5 Drawing Figures

Inventors
Patrick H. Green
George W. Foster

By *Maybee & Legris*

Attorneys

Inventors
Patrick H. Green
George W. Foster

By Maybee & Legris

Attorneys

METHOD FOR MAKING SIGNS AND OTHER ARTISTIC WORKS

BACKGROUND OF THE INVENTION

This invention relates to a method of making signs and other artistic works.

The usual way of making a sign is by painting upon a previously prepared flat surface which forms the backing. The painted surface may be protected with a transparent covering material. The present invention provides a durable sign having a protective coating that can be transparent, and adhere tenaciously to the rest of the sign, and be tough and resistant to scratching and wear and tear.

SUMMARY OF THE INVENTION

In accordance with the present invention signs and other artwork are made with facing and background layers of polyester or epoxy resin with one or more light-reflective patterns of letters or other artwork between them. Because epoxy resins are comparatively expensive, the invention will be described with particular reference to polyester resins. A first layer of polyester resin is spread over a smooth mould surface and allowed to cure (whereby it sets and hardens). This first polyester layer is transparent and forms a continuous protective covering. One or more coloured layers (which may be of polyester resin, but preferably are of more quickly drying lacquer) are next applied in desired patterns, preferably by silk screening, and a background layer of polyester resin is applied over the first and the coloured layers. A glass fibre backing may be applied over the background layer. Each layer, including the glass fibre backing, is applied when the exposed surface of the last applied layer of polyester resin has set to a tack free condition (i.e., a condition in which it would not adhere to a silk screen laid on it). The resin cures more slowly when exposed to air than when air is excluded therefrom, but it is not necessary to wait until its exposed surface is completely cured or hardened before applying the next layer.

BRIEF DESCRIPTION OF THE DRAWING

Preferred ways of carrying out the invention will be described with reference to the accompanying drawings in which.

DESCRIPTION OF THE PREFERRED EMBODIMENTS

Figure 1:
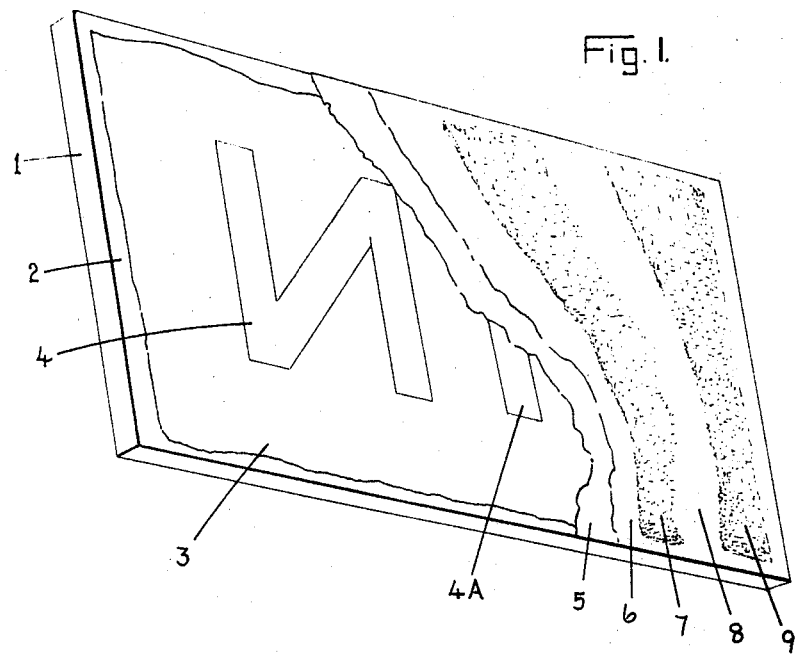
FIG. 1 is a perspective view, partly broken away, illustrating the production of a sign.

In the embodiment illustrated in FIG. 1, a mould plate 1 having a smooth, flat, polished working surface 2 is prepared by coating the working surface with a parting or release agent, for example wax. Preferably at least six coats of wax are applied, each coat being polished to a high lustre before the next coat of wax is applied.

A layer of transparent polyester resin 3 in liquid form is sprayed on the waxed working surface 2 of the mould 1, where it forms a continuous transparent non-yellowing protective front layer for the sign. The mould 1 may be supported in an upright position, on an easel, while it is being sprayed. The flow rate through the tip of the spray nozzle is regulated to achieve maximum break-up or mist. The spraying can be performed using a No. 30 spray nozzle and 20 to 40 p.s.i. air pressure, and is carried out, as are the subsequent steps, in a very clean dust free environment. The resin is a clear resin in which, just before spraying, a polymerization (hardening) catalyst is added and thoroughly mixed. The preferred resin is an unsaturated thermosetting polymerizable polyester resin that has mixed with it 0.1 to 2.0 percent by weight of a crosslinking agent, said agent consisting of monomeric styrene mixed with about 6% by weight of cobalt naphthenate (an accelerator). (Such a light-stabilized resin is marketed by the Glidden Company, Division of S.C.M. Canada Ltd., under the trade mark "GelKote" and is designated by their Catalog No. TGL 18707. This resin also includes a small amount of monomeric methyl methacrylate which assists crosslinking, improves the weathering qualities of the resin, and gives an improved gloss to the front surface of the layer 3 in contact with the waxed surface 2. Light stability is imparted by means of a known additive, namely, that sold by American Cyanamid Company under the designation UV No. 9.) The preferred polymerization catalyst is methyl ethyl ketone peroxide (60% by weight) in dimethyl or dibutyl phthalate. (Such a catalyst is sold by the Lucidol division of Harchem Limited under the trade mark "Lupersol DDM" hardener.) The preferred resin and catalyst are mixed in a spray pot, the weight of catalyst being 1 to 2% of the weight of resin (for example, 1 fl. oz. of catalyst to 28.5 cc. of resin). Typical coverage of resin layer 3 on the mould surface 2 is 1 lb. per 8 square feet, producing a thickness of eight to ten thousandths of an inch. The layer 3 should not be less than about eight thousandths of an inch thick or it may not adequately cure and release from the mould. After spraying the layer 3, the spray gun should be cleaned immediately in acetone to remove resin that would otherwise harden in the gun.

The layer or gel coat of resin 3 polymerizes exothermically. The rate of polymerization or curing can be increased by increasing the amount of catalyst, but excessive catalyst can cause the layer 3 to be brittle and yellow. The layer 3 is allowed to set in a dust free atmosphere for a period of about 8 hours at room temperature environment (about 70° F). One characteristic of the resin is that it cures more rapidly in the absence of air than in its presence. At the end of this first period the front surface of the resin 3, being out of contact with air, may be quite hard, but its opposite (rear) surface which is exposed to air has set to only a tack free condition. It is to be understood that throughout this process the resin may harden in less time if the temperature is raised but in each step the hardening time and temperature must be correlated so that the rear exposed surface of the resin has reached at least a tack-free condition before the next layer is applied.

The next step of producing a sign according to the method illustrated in FIG. 1 consists of stencilling, preferably by silk screening, a light-reflective layer 4 over the exposed rear surface of the layer 3. The layer 4 is applied in a predetermined pattern, e.g., to form one or more letters of a sign, and thus is not a continuous layer covering the whole of the rear surface of the layer 3. The layer 4 may also be a thermosetting polyester resin, but includes a pigment and is in a fluid paste form suitable for silk screening. (Such a paste is marketed by the Glidden Company as Catalog No. TGL with suffix numbers that designate colour.) Before the silk screening step the resin paste is mixed with the catalyst, the same one and in the same proportion as used for the layer 3, and after silk screening the layer 4 is allowed to cure for a period of about 4 hours at a temperature of 70° F. Silk screening is a well known art and need not be described in detail. It will suffice to say that the mould 1 is secured to a screening table and the silk screen is placed on the mould, located and clamped. A quantity of the silk screening paste is then poured on the screen at one end forming a continuous line from one side of the screen to the other. A squeegee is placed behind the line of paste and is drawn, with a firm downward pressure, from one end of the screen to the other in one motion, forcing the paste through the openings in the screen onto the surface below. When the screening is finished, the screen is lifted off the mould and is immersed in an acetone bath for cleaning, but is removed from the bath before the artwork on the screen is dissolved by the acetone. The spraying and silk screening operations must be performed in a dust-free atmosphere as even small particles of dust on the surface to be silk screened can tear the fine silk when the squeegee is drawn over them. The exposed rear surface of the previously applied layer of resin 3 must have set to a tack free condition before screening, for otherwise the silk screen will adhere to it. It is desirable to allow the layer 3 to cure for about half an hour after it has reached the tack free condition. It is found that a silk screen can safely be applied to the exposed surface of the layer 3 if a squeak is produced by rubbing the exposed surface with a dry finger. It is important to note that it is not necessary to wait until the exposed surface of the layer 3 has completely cured or hardened: a process requiring complete curing or hardening would be substantially more time consuming and thus less economic.

A number of similar steps may follow, in each step a new layer of coloured resin being deposited over a preceding layer or layers after the exposed surfaces of the latter have set to a tack free but unhardened condition. For example, if in FIG. 1 the layer 4 consisted solely of the letter N, the next step could consist of applying another, adjacent letter 4A in a different colour. One letter or pattern could overlap another. However nothing should touch the exposed surface of the polyester resin layer forming the letter N until it has set to a tack-free condition. After the desired patterns 4, 4A of letters or other artwork have been applied, a coloured background layer 5 is sprayed to form a continuous background for the preceding layers. The layer 5 is applied in the same manner as the layer 3, and has the same composition as said layer 3 but with a colour pigment added. Because the patterns 4, 4A do not completely cover the layer 3, the layer 5 is, in several areas, in direct contact with the layer 3 so that a direct and firm adhesion is achieved between the layers 3 and 5. The patterns 4, 4A also adhere to both the layer 3 and the layer 5.

Although the pattern between the layers 3 and 5 can be formed by intermediate layers 4, 4A of coloured polyester resin each such intermediate layer may take a couple of hours to reach tack-free condition, and it is preferred to use more quickly drying material for the patterns between the layers 3 and 5. A suitable material is a cellulose acetate butyrate modified acrylic lacquer. (Such lacquers are sold by Naz-Dar Company Limited under the trade mark Naz-Dar.) At room temperature such a lacquer can dry in 20 to 40 minutes, and will dry more rapidly if force dried. Successive differently coloured lacquers can be applied to the exposed surface of resin layer 3 (to form the intermediate layers 4, 4A which may be spaced apart or overlap) by successive silk screening operations after the exposed surface of layer 3 is tack free, each layer of lacquer being applied after any preceding lacquer layers have dried. The lacquer patterns adhere to the layer 3. The background layer 5 should be sprayed on as soon as the intermediate pattern layers 4, 4A of lacquer have dried, to minimize the risk of any dirt settling on their exposed surfaces or on the still exposed part of the rear surface of layer 3. It is found that the background layer adheres to the dried lacquer as well as to the resin layer 3 as it hardens.

The first layer 3 is a facing layer, and serves as a clear protective layer for the sign. The word "clear" is intended to include any layer which allows the light-reflective pattern or patterns behind it to be seen, the important characteristic being that the facing layer transmits light, though it may not in all cases be crystal clear. For example, to achieve a particular effect, the clear layer 3 may be merely translucent. The intermediate layers 4, 4A behind the layer 3 are light-reflective, consisting of any desired colours including black and white. The background layer 5 will normally be opaque, in a solid colour (for example, white) different from the colour of any intermediate layer.

Figure 2:
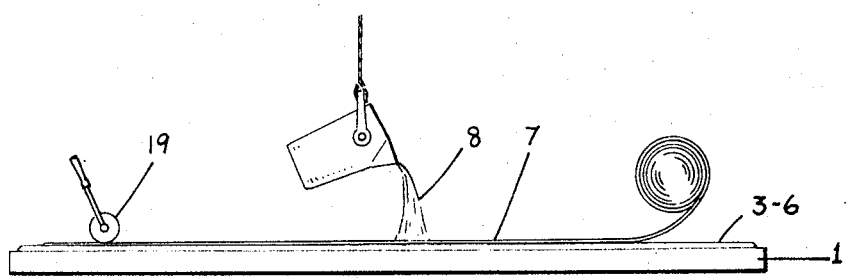
FIG. 2 is a side view illustrating the application of a backing layer.

Over the background layer 5 a stiff glass fibre backing is formed. When the exposed surface of the layer 5 has cured to a tack free condition it is provided with a coating 6 of a general purpose polyester laminating resin. This resin is like that used for the layer 3 but includes a thixotropic agent, for example, finely divided silica (e.g., that sold under the trade mark Cab-O-Sil or the trade mark Sontocel CX). (Such a resin is made by the Glidden Company and marketed as Catalog No. TVL 70118.) The catalyst methyl ethyl ketone peroxide is mixed with this resin, the ratio being 1 fl. oz. of catalyst to 28.5 cc. of resin. The coating 6 is applied by means of a soft roller. A woven glass fibre mat 7 having a weight of 1.5 oz./sq. yard is laid over this fluid coating 6 (FIG. 2) and is saturated with more of the laminating resin 8, an air release roller 19 being rolled over the mat until all entrapped air has been removed. A fluid coating of the laminating resin is left on the upper surface of the mat 7, and another glass fibre mat 9 is laid on this fluid coating, the same sequence being repeated till a sufficiently thick backing has been built up. The thickness of the backing depends on the stiffness required for the sign, but three layers of mat have been found to be suitable for most purposes. When these layers have been applied the backing is allowed to harden. The resultant sign is then removed from the mould plate 1 and is trimmed to size with a diamond-toothed saw.

Figure 3:
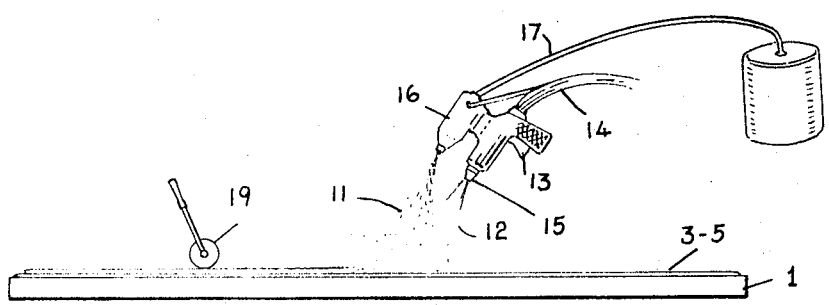
FIG. 3 is a side view illustrating another way of applying a backing layer.

An alternative method of forming the stiff backing is illustrated in FIG. 3 and consists of spraying, onto the exposed, tack free surface of the layer 5, finely chopped glass fibre strands 11 mixed with the laminating resin 12, using automatic spraying equipment. The thixotropic agent in the laminating resin prevents draining of the resin from the glass fibres if sprayed onto a vertical or near vertical surface. The spraying can be done by means of a catalyst injection spray unit, a preferred unit being a Glos-Craft (trade mark) portable unit having the following parts:

1. A spray gun 13 having an internal mixing chamber.
2. A positive displacement pump (not shown) for delivering the resin from a drum via one of the lines 14 to the mixing chamber.
3. A pressurized flow meter (not shown) for introducing the catalyst via another of the lines 14 into the mixing chamber at an appropriate ratio to the amount of resin (e.g., 0.5 to 3.0% catalyst).
4. A spray nozzle 15 from which the resin 12 (admixed with catalyst) is sprayed.
5. An air driven chopper and blower 16 which receives continuous yarn 17 of glass fibre (about 277 yards per pound), breaks it into lengths of between 1 and 2 inches, and blows these lengths in a stream 11 that mixes with the resin 12.
6. An acetone flushing device (not shown) for delivering acetone through one of the lines 14 for cleaning the unit after use.

The spray gun can be operated to spray only the resin 12, and the preferred sequence is first to spray a layer of fluid resin 12 over the layer 5, and then spray onto that fluid layer a mixture of resin and fibre (containing about 25 to 30% by weight of fibre), the sprayed resin 12 and fibre 11 being compressed by means of an air release roller 19. The resultant backing is allowed to harden. The sign is then removed from the mould plate 1 and trimmed. The thickness of the sprayed glass fibre backing should be at least about 1/16 inch, and will depend on the flexibility and strength required for the sign. For a sign measuring 2 feet by 4 feet, a backing 1/8 inch thick has been found suitable, and for a sign measuring 4 feet by 8 feet, the thickness should be about 3/16 inch.

Because of the pressure that is applied when forming the glass fibre backing, principally by the air release rollers 19, it is important that the background layer 5 and the layers 4, 3 beneath it are not harmed. If the background layer 5 has set to at least a tack free condition before the backing is applied no difficulties have been encountered.

Before removing the sign or other work from the mould it is desirable to seal its rear surface and edges to prevent the intrusion of moisture which could cause the glass fibres to bloom or wick. The laminating resin previously described for use with the glass fibres is a good sealer. It is mixed with 2% catalyst, 12% thixotropic agent (e.g., fumed silica), 1% liquid paraffin (for a glossy finish) and 4% of a colouring agent, these components being thoroughly mixed and sprayed to produce a film thickness of eight to ten thousandths of an inch over the back and edges of the sign. This sealing coat is allowed to harden before removing the product from the mould.

The glass fibre backing may not be required for all signs or other works, but it is valuable both for imparting stiffness to the sign and for covering the exposed surface of layer 5 and thus hastening the complete hardening of the sign, air being excluded by the backing and the mould 1. If the glass fibre backing is not used, it is desirable to include a filler in the layer 5 to impart some impact resistance. Such a filler can also help to render the layer 5 opaque, and it is preferred to incorporate such filler even when a glass fibre backing is provided. The layer 5 may be applied at the rate of 1 pound to 6 square feet of area, resulting in a thickness of five to fifteen thousandths of an inch. The layers 4, 4A and 5 need only be of sufficient thickness to provide the colouration and opacity that is desired.

The wax on the mould surface 2 is provided to prevent the layer 3 from sticking to the surface 2. The highly polished wax also helps to form a smooth, glasslike finish on the front surface of the completed sign.

The finished sign can consist of a tough, transparent, high gloss protective facing layer 3, one or more differently coloured layers 4, 4A and 5 applied in desired patterns, e.g., to form letters or other designs, and a stiff but flexible backing.

The colours of the layers 4, 4A and 5 are moulded into the sign and are well protected against scratching and other forms of physical abuse by the front layer 3 which is durable, non-yellowing, difficult to scratch and adheres tenaciously. The front layer, although transparent, acts as a screen for the ultraviolet rays of the sun, protecting the colours in the sign from fading.

Because considerable heat is given off as the polyester resin layers cure or harden, the mould must be constructed of heat resistant material that does not readily warp.

Figure 4:
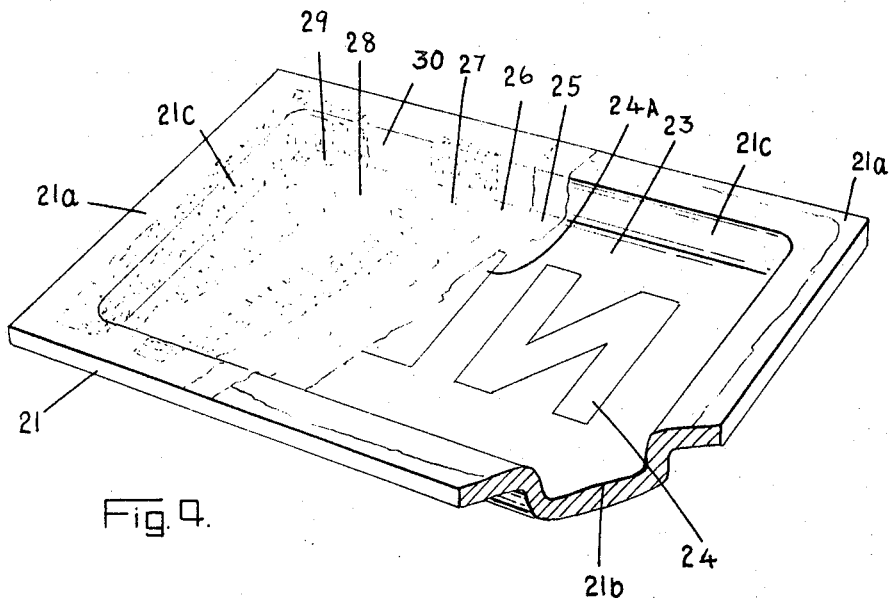
FIG. 4 is a perspective view, partly broken away, illustrating the production of a sign of different shape.

The mould plate of FIG. 1 has a flat working surface 2 on which a plane sign can be produced. It is possible, however, to make signs with curved edges or intermediate curved portions or which consist of a continuous curved surface. For example, in the embodiment illustrated in FIG. 4 the mould 21 is a female mould having a raised edge 21a surrounding the flat working surface 21b which forms the bottom of a cavity. The cavity has curved side walls 21c which are smooth and polished and form an upward continuation of the working surface 21b. The process of making a sign is the same as described in connection with the embodiment of FIG. 1, but here the sides 21c are also coated with wax and the layers 23 to 29 (which correspond to the layers 3 to 9 respectively in FIG. 1) extend up the side walls 21c. A finished sign made in the mould 21 has edges 30 which extend rearwardly from the front face of the sign. Alternatively the sign could be formed over a male mould member, with peripheral edges extending forwardly from the front face of the sign.

The silk screening operation is usually done on flat surfaces and is more difficult to perform on a curved surface. If, in an embodiment such as that of FIG. 4, a coloured pattern 24 is to extend over curved portions of the sign, spraying rather than silk screening may have to be used for depositing coloured resin or lacquer over such curved portions. However silk screening is much preferred because of the sharp outlines that can be achieved for the patterns 24, 24A.

Figure 5:
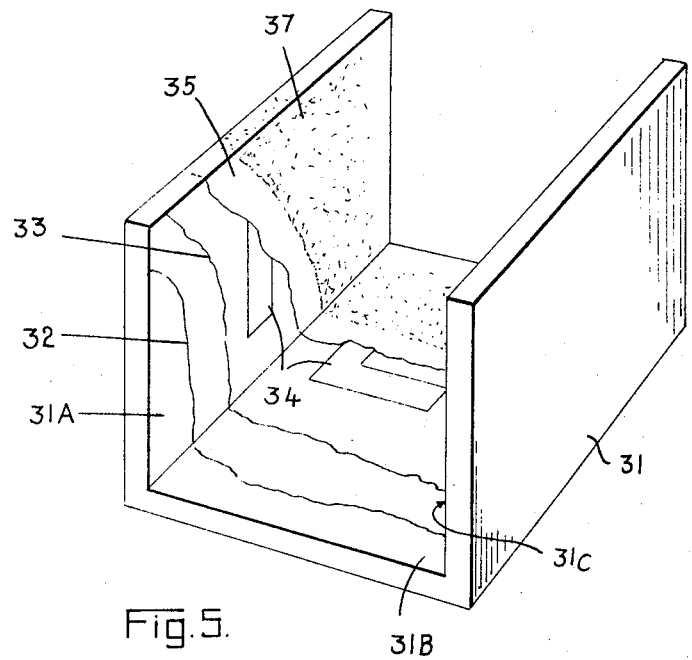
FIG. 5 is a similar view of the production of a sign of another shape.

FIG. 5 shows a sign of another configuration, formed within a U-shaped mould 31. The mould is coated with a parting agent 32 over which a clear polyester layer 33 is formed, followed by an intermediate light-reflective pattern layer or layers 34, then a light-reflective polyester background layer 35, and then a glass fibre backing 37. The layers 33, 35 and 37 are applied by spraying. The patterns 34 are applied by silk screening over the layer 33 when the latter is tack free. The mould 31 has three inner faces 31A, 31B and 31C and patterns 34 can be successively silk screened over the layer 33 on any of these mould faces.

Signs made in accordance with the invention have been found to have excellent durability and are suitable for road signs wherein the intermediate layers 4, 4A are traffic symbols.

What we claim as our invention is:

1. A method of making signs and other artwork, comprising forming on a mould surface a clear protective facing layer, at least about eight thousandths of an inch thick, of hardenable resin that does not adhere to the mould surface and is removable from the mould surface after hardening, the resin being selected from the group consisting of polyester and epoxy resins, allowing said clear layer to cure until an exposed surface thereof is at least tack free, applying in a predetermined pattern over part of said tack free surface at least one intermediate layer of fluid light-reflective material that sets in said pattern, applying over the remainder of said exposed surface and over the intermediate layer a background layer of said hardenable resin that adheres to said clear layer, and then applying a stiff resin impregnated glass fiber reinforcing backing to the background layer.

2. A method as claimed in claim 1, wherein the hardenable resin of each of the facing and background layers is an unsaturated polyester resin mixed with a crosslinking agent, a polymerization catalyst, and an accelerator.

3. A method as claimed in claim 1, wherein the background layer is an opaque layer having an exposed surface over which said backing is applied after the exposed surface of the opaque layer has cured to a tack free condition.

4. A method as claimed in claim 3, wherein the hardenable resin is one that cures more rapidly when air is excluded, and the backing and mould exclude air therefrom.

5. A method as claimed in claim 1, wherein the intermediate layer is applied by silk screening without waiting for complete curing of said exposed surface.

6. A method as claimed in claim 5 wherein a plurality of intermediate layers of different colours are successively applied by silk screening to said surface before the background layer is applied.

7. A method as claimed in claim 6 wherein each intermediate layer comprises polyester resin mixed with a crosslinking agent and a polymerization catalyst, and in which a subsequent intermediate layer is applied only after the preceding layer has cured sufficiently that a silk screen will not adhere to it.

8. A method as claimed in claim 6 wherein each intermediate layer comprises an acrylic lacquer which is dried before the next layer is applied.

9. A method as claimed in claim 8 wherein the lacquer comprises cellulose acetate butyrate modified acrylic lacquer.

* * * * *